United States Patent [19]

Ohta et al.

[11] Patent Number: 4,532,180

[45] Date of Patent: Jul. 30, 1985

[54] GARNET FILM FOR ION-IMPLANTED MAGNETIC BUBBLE DEVICE

[75] Inventors: Norio Ohta, Sayama; Keikichi Ando, Musashino; Yuzuru Hosoe, Hachioji; Yutaka Sugita, Tokorozawa; Fumihiko Ishida, Hachioji, all of Japan

[73] Assignee: Hitachi, Ltd., Tokyo, Japan

[21] Appl. No.: 471,806

[22] Filed: Mar. 3, 1983

[30] Foreign Application Priority Data

Mar. 5, 1982 [JP] Japan ................................ 57-33859

[51] Int. Cl.$^3$ ................................................ G11B 5/64

[52] U.S. Cl. ..................................... 428/336; 365/33; 252/62.57; 427/38; 428/692; 428/693; 428/900; 428/910

[58] Field of Search .................. 365/33; 428/692, 693, 428/900, 910; 252/62.57, 62.59, 62.63; 427/38

[56] References Cited

U.S. PATENT DOCUMENTS 4,476,152 10/1984 Imura .................................. 427/38

*Primary Examiner*—Ellis P. Robinson

*Attorney, Agent, or Firm*—Antonelli, Terry & Wands

[57] ABSTRACT

The invention relates to a garnet film for an ion-implanted device characterized in that the quantity of Fe is increased and a predetermined quantity of Gd is added.

The garnet film of the invention has a sufficiently high Curie temperature without sacrificing its other properties and hence is extremely suitable as a garnet film for an ion-implanted device.

5 Claims, 6 Drawing Figures

GARNET FILM FOR ION-IMPLANTED MAGNETIC BUBBLE DEVICE

BACKGROUND OF THE INVENTION

1. Field of the Invention

This invention relates to a garnet film for an ion-implanted magnetic bubble device. More particularly, the present invention relates to a garnet film for an ion-implanted magnetic bubble device which film is specifically suitable for a magnetic bubble device of the type in which at least part of the propagation track of the magnetic bubbles, or at least part of its functional portions such as the transfer gate, generator, etc., is formed by ion implantation. (A device of this kind will be hereinafter referred to as an "ion-implanted device" or an "ion-implanted magnetic bubble device".)

2. Description of the Prior Art

The so-called "permalloy device" whose propagation circuit (propagation track) for the propagation of magnetic bubbles is formed by permalloy patterns has been put into general practical use as a magnetic bubble device, as is known in the art.

If the diameter of the magnetic bubbles is reduced in order to increase the memory density, the sizes and gaps in the transfer pattern must be made extremely small, but such an extremely fine transfer pattern is extremely difficult to fabricate accurately. Moreover, the rotating magnetic field necessary for the transfer must be increased and this is extremely disadvantageous for the operation of the device.

Ion-implanted devices have been proposed to eliminate these problems (e.g., U.S. Pat. No. 3,828,329) in which the propagation circuit is formed by ion-implantation, not by a permalloy film.

Ions such as $He^{+}$, $Ne^{+}$, $H^{+}$, or $D^{+}$, etc, are implanted into the upper layer of the desired region within a magnetic garnet film supporting the magnetic bubbles so that a distortion layer having a large lattice constant is formed in the upper layer of the magnetic garnet film, and a layer whose direction of magnetism is parallel to the film surface is formed by the reverse magneto-striction effect.

Accordingly, in this ion-implanted device, the magnetic garnet film has a layer supporting the magnetic bubbles (generally, the lower layer) and an ion-implanted layer driving the magnetic bubbles (generally, the upper layer) and these two layers are used to support and drive the magnetic bubble, respectively.

In conventional permalloy devices, the magnetic garnet film is only used to support the magnetic bubbles and hence it has been necessary to provide a propagation circuit consisting of a permalloy film over the garnet film in order to drive the magnetic bubbles. The ion-implanted device eliminates the necessity of providing a propagation circuit over the garnet film.

The upper limit of the temperature range in which the magnetic bubbles can be smoothly supported and driven without any problems is determined by the lower of the Curie temperatures Tc of the magnetic bubble driving layer and the magnetic bubble supporting layer inside the magnetic garnet film in the ion-implanted device.

In the permalloy device, the Curie temperature Tc of the permalloy film is much higher than that of the magnetic garnet film supporting the magnetic bubbles so that the upper limit of the operating temperature is determined by Tc of the magnetic garnet film.

In the ion-implanted device, on the other hand, it has been found that the Curie temperature Tc of the ion-implanted region of the magnetic garnet film decreases in proportion to the dosage of implanted ions. For example, FIG. 1 illustrates the relation between the ion dosage and the Curie temperature Tc when $Ne^{+}$ or $He^{+}$ ions are implanted in a magnetic garnet film. In both cases, Tc drops dramatically with the increase in the ion dosage.

For this reason, the upper limit of the operating temperature range of the ion-implanted device is determined by the Curie temperature Tc of the magnetic bubble driving layer formed by implanting ions into the upper layer of a magnetic garnet film.

The Curie temperature Tc of $(YSmLuCa)_3(FeGe)_5O_{12}$ that is conventionally used as a typical magnetic garnet film for a magnetic bubble device is about 200° C., but when ion implantation is done under standard conditions (such as the $He^{+}$ ion implantation of $1.6\times10^{15}$ doses), Tc drops to about 170° C. Accordingly, the operating temperature range of the device drops by about 30° C. when compared to a conventional permalloy device and this is a critical problem that must be solved before ion-implanted devices can be put to practical use.

SUMMARY OF THE INVENTION

It is therefore an object of the present invention to provide a magnetic garnet film for an ion-implanted magnetic bubble device which can operate over a wide temperature range without any difficulties, and can solve the conventional problems without changing the fundamental characteristics such as the diameter of the bubbles that can be supported, or the size of the bubble collapse field.

To accomplish the object described above, the present invention controls the various properties of the garnet film such as the saturation magnetic induction to desired values by adding a predetermined quantity of gadolinium so as to increase the Curie temperature by increasing the quantity of iron.

DESCRIPTION OF THE PREFERRED EMBODIMENTS

Generally, the Curie temperature Tc of a magnetic garnet becomes higher with an increase in the quantity of Fe ions contained therein. For garnet having a composition expressed by the general formula $Y_3Fe_{5-y}Ga_yY_{12}$, Tc is 140° C. for $Y_3Fe_{4.0}Ga_{1.0}O_{12}$ when $y=1.0$, and is 278° C. for $Y_3Fe_5O_{12}$ when $y=0$.

To raise Tc, therefore, the quantity of Fe ions should preferably be larger. However, the quantity of Fe ions also affects the saturation magnetic induction (saturation magnetization) of the magnetic garnet significantly, and hence it is not very desirable to increase the quantity of Fe ions too much.

For instance, the saturation magnetic induction $4\pi M_{Fe}$ of the Fe ions in $Y_3Fe_4GaO_{12}$ is 300 G, whereas it is as much as 1800 G for the Fe ions in $Y_3Fe_5O_{12}$. In other words, the greater the quantity of Fe ions, the greater the value of $4\pi M_{Fe}$.

The saturation magnetic induction $4\pi M_{film}$ of a film of $(YSmLuCa)_3(FeGe)_5O_{12}$ that has been generally used in the past is the saturation magnetic induction $4\pi M_{Fe}$ of the Fe ions themselves (i.e., $4\pi M_{film}=4\pi M_{Fe}$) so that if the quantity of Fe ions is increased (or if the quantity of Ga ions is decreased), Tc rises but at the same time, $4\pi M_{film}$ also becomes greater and the bubble diameter d becomes smaller than the desired value.

If the period of the propagation circuit of the magnetic bubble device is determined, the diameter d of the magnetic bubbles must be made constant in accordance with the period, and deviations from the desired design value are disadvantageous.

It is of utmost importance, therefore, to raise Tc while preventing any rise of $4\pi M_{film}$.

The present invention solves this problem by adding a suitable quantity of Gd ions.

Figure 1:
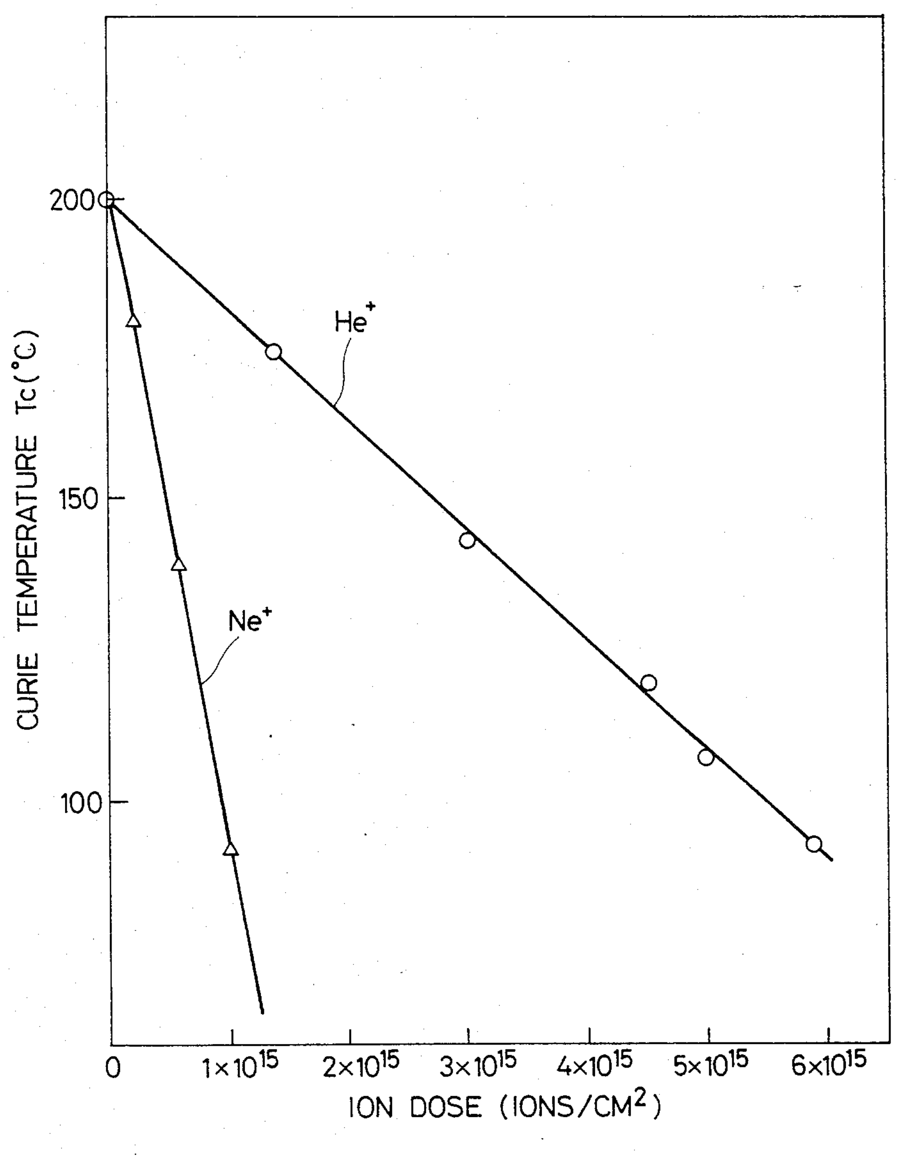
FIG. 1 is a diagram showing examples of the drop of Curie temperature caused by ion implantation.
Figure 2:
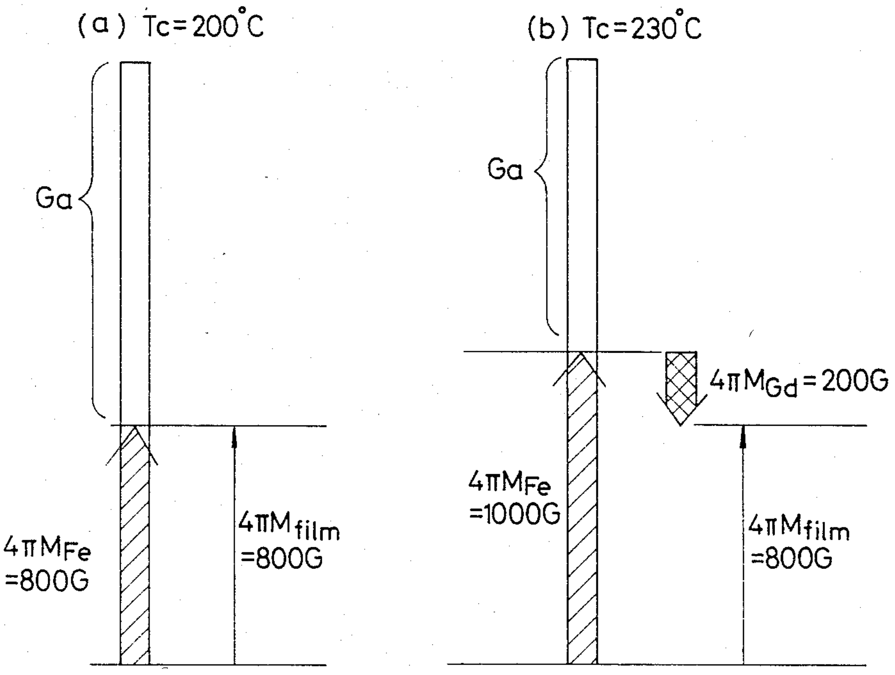
FIG. 2 is a diagram explaining the principle of limiting the influence of Fe by Gd.

In other words, when Gd ions are placed at dodecahedral positions in the garnet structure, their magnetizing direction is opposite to the magnetizing direction $4\pi M_{Fe}$ of Fe ions placed at tetrahedral positions, as shown in FIG. 2, so that the value of the saturation magnetic induction $4\pi M_{Gd}$ is negative if $4\pi M_{Fe}$ is positive.

The saturation magnetic induction $4\pi M_{film}$ of the magnetic garnet film is the sum of these values, and it can be expressed as $4\pi M_{film}=4\pi M_{Fe}+4\pi M_{Gd}$. So that, $4\pi M_{film}$ can be controlled to a desired value, even if $4\pi M_{Fe}$ is large so as to increase Tc, by cancelling the increase of $4\pi M_{Fe}$ by the doping of Gd.

In this case, since the Gd ions do not affect Tc, Tc can be controlled to a desired value by the quantity of Fe ions alone.

FIG. 2(*a*) shows what happens when there are no Gd ions. The value of $4\pi M_{film}$ in this case is equal to $4\pi M_{Fe}$ and the Curie temperature Tc is 200° C.

If Tc is raised to 230° C. by increasing the quantity of Fe ions (by reducing the quantity of Gd ions) as shown in FIG. 2(*b*), the value of $4\pi M_{Fe}$ increases at the same time with the increase in the quantity of Fe ions and reaches 1,000 G which overcome the desired $4\pi M_{film}$ value.

If there are no Gd ions, the value of $4\pi M_{film}$ reaches 1,000 G. If there are Gd ions, on the other hand, suitable $4\pi M_{Gd}$ (=200 G) appears in the direction opposite to $4\pi M_{Fe}$, so that $4\pi M_{film}$ is kept at 800 G (desired value).

In other words, the present invention raises Tc by increasing the quantity of Fe ions and offsets the increase of $4\pi M_{Fe}$, which increases with the increase in Fe ions, by $4\pi M_{Gd}$ appearing in the opposite direction because of the addition of Gd ions. As a result, an increase in $4\pi M_{film}$ can be effectively prevented and only Tc is increased.

The present invention provides another advantage in that since Gd ions have an extremely small magnetic loss, the mobility of the magnetic bubbles does not drop even when Gd ions are added. This is desirable for high speed device operation.

However, when the quantity of added Gd ions becomes too large, the lattice constant of the garnet film becomes larger because the Gd ions have large radius and do not conform with the lattice constants of $Gd_3Ga_5O_{12}$ (12.383 Å) or $Sm_3Ga_5O_{12}$ (12.437 Å) that have been used as substrates for liquid phase epitaxial growth, and serious film defects are generated in the resulting garnet film.

If the quantity of added Gd ions is too excessive, the temperature change ratio $H_{OT}$ of the bubble collapse field $H_o$ changes markedly. Accordingly, it is advisable that the quantity of added Gd ions is not too large.

Gallium and germanium are preferred as non-magnetic ions for substituting Fe ions, because they make it easy to carry out liquid phase growth.

Samarium is preferred as an element that causes uniaxial anisotropy perpendicular to the film surface to support the magnetic bubbles. Non-magnetic yttrium or lutetium ions is suitable as an element for adjusting the lattice constant.

When $Ge^{4+}$ ions are used as ions substituting for some of the Fe ions, an equivalent quantity of $Ca^{2+}$ ions must be added in order to compensate for the charge difference.

Accordingly, the composition of the magnetic garnet film in accordance with the present invention is expressed by the general formula $\{R\}_{3-x}Gd_xFe_{5-y}\{M\}_yO_{12}$. Here, R is Sm and at least one element selected from Y, Lu and Ca, and M is at least one of Ga and Ge.

In the present invention, the properties of the garnet film vary with the values of x and y in the subscripts of R and M, respectively, so that the values of x and y must be within predetermined ranges.

Table 1 illustrates the bubble diameter d, the bubble collapse field $H_o$, the temperature coefficient of bubble collapse field $H_{OT}$, and the Curie temperature Tc, when the values of x and y are varied in garnet films grown on the (111) oriented face of $Gd_3Ga_5O_{12}$ substrate, expressed by the general formula $$\{R\}_{3-x}Gd_xFe_{5-y}\{M\}_yO_{12}.$$

In Table 1, the symbol 0 indicates films whose properties satisfy the conditions of: a magnetic bubble diameter kept less than or equal to 2.5 μm, a temperature coefficient of $H_{OT}$ ranging from −0.4 to 0.0%/°C., and a Curie temperature Tc higher than that of films in which Gd is not added and whose magnetic bubble diameter is equal to that of the above. The symbol X indicates films whose properties do not satisfy these conditions.

Figure 3:
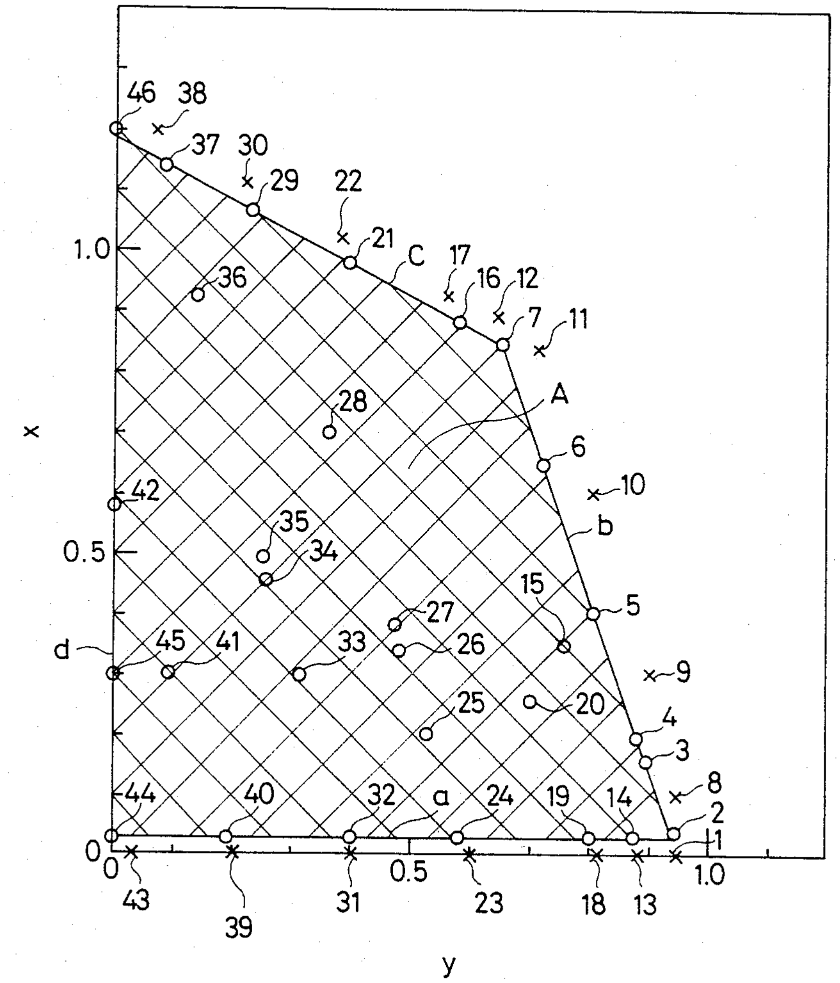
FIG. 3 is a graph showing the preferred ranges of x and y in the present invention.

FIG. 3 illustrates the results of Table 1 using x and y as the parameters. In the graph, the symbols O and X have the same meanings as in Table 1, and the numerals beside each O and X correspond to the numerals in the number column of Table 1.

As can be seen clearly from FIG. 3, small magnetic bubbles having a diameter less than 2.5 μm can exist stably if the values of x and y are within the region encompassed by or on the line a connecting point 44 (0.03, 0) and point 2 (0.03, 0.94), the line b connecting point 2 (0.03, 0.94) and point 7 (0.85, 0.65), the line c connecting point 7 (0.85, 0.65) and point 46 (1.20, 0) and the line d connecting point 46 (1.20, 0) and point 44 (0.03, 0). Moreover, the Curie temperature Tc becomes higher and the temperature coefficient of the bubble collapse field becomes smaller than the case where there are no Gd ions.

When a magnetic garnet film having these properties is applied to the ion-implanted device by implanting ions into the desired regions of the film, the temperature range of the device in which it can operate stably is markedly wider than that when a conventional garnet film is used, and an extremely excellent device can be obtained.

Moreover, if the values of x and y are within the range above the line a described above, the magnetic wall mobility also becomes greater due to the effects of the Gd ions. Hence, the garnet film in accordance with the present invention is also extremely advantageous from the viewpoint of the high speed operation of the device.

Figure 4:
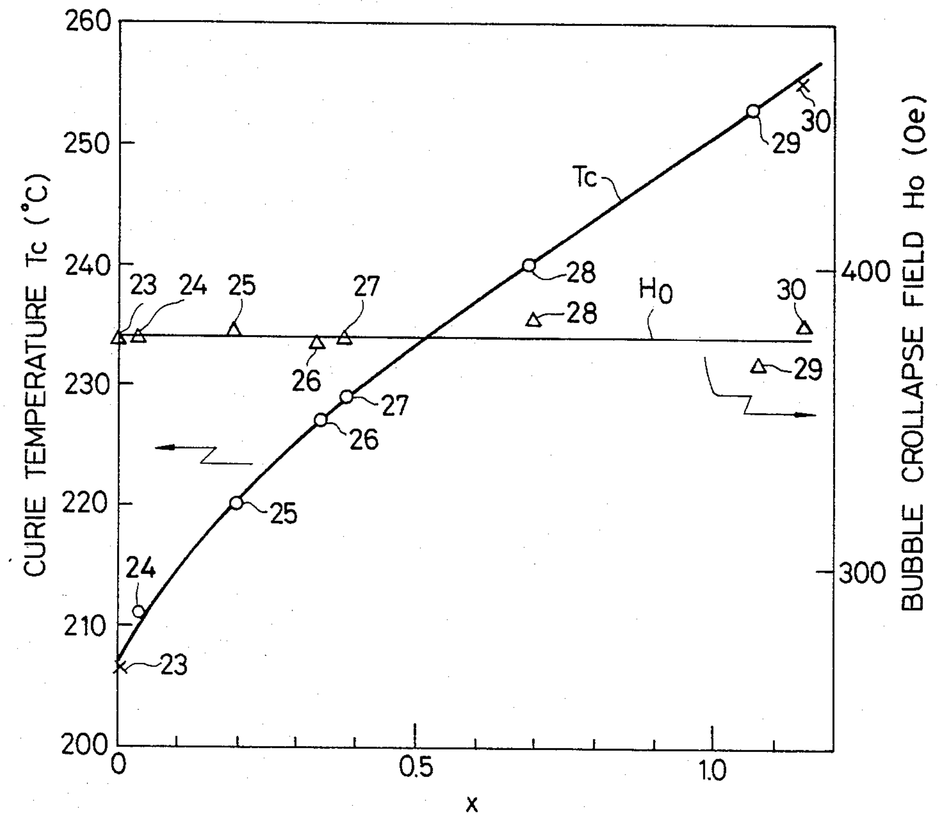
FIGS. 4 through 6 are graphs each showing an effect of the present invention.

In other words, the eight kinds of garnet film Nos. 23 through 30 can support tiny magnetic bubbles having a diameter of between 0.9 to 1.0 μm, and the relationship between the Curie temperature Tc and the bubble collapse field $H_o$ versus the quantity of Gd ions x is as shown in FIG. 4.

TABLE 1

| No. | Composition | Q'ty of $Gd_x$ | Q'ty of $Ga_y$ | Bubble diameter d(μm) | Film thickness h(μm) | Bubble collapse field $H_o$ (0e) | Temperature change ratio $H_{OT}$ of $H_o$ (%/°C.) | Curie temperature Tc (°C.) | Properties |
|---|---|---|---|---|---|---|---|---|---|
| 1 | $Y_{2.10}Sm_{0.55}Lu_{0.35}Fe_{4.05}Ga_{0.95}O_{12}$ | 0 | 0.95 | 2.4 | 2.2 | 160 | −0.36 | 160 | X |
| 2 | $Y_{1.81}Sm_{0.54}Lu_{0.62}Gd_{0.03}Fe_{4.06}Ga_{0.94}O_{12}$ | 0.03 | 0.94 | 2.4 | 2.2 | 160 | −0.31 | 165 | O |
| 3 | $Y_{1.59}Sm_{0.54}Lu_{0.72}Gd_{0.12}Fe_{4.09}Ga_{0.91}O_{12}$ | 0.12 | 0.91 | 2.4 | 2.2 | 160 | −0.25 | 170 | O |
| 4 | $Y_{1.59}Sm_{0.55}Lu_{0.70}Gd_{0.16}Fe_{4.10}Ga_{0.90}O_{12}$ | 0.16 | 0.90 | 2.5 | 2.4 | 165 | −0.20 | 172 | O |
| 5 | $Y_{1.30}Sm_{0.50}Lu_{0.80}Gd_{0.40}Fe_{4.19}Ga_{0.81}O_{12}$ | 0.40 | 0.81 | 2.5 | 2.4 | 158 | −0.15 | 180 | O |
| 6 | $Y_{1.20}Sm_{0.40}Lu_{0.75}Gd_{0.65}Fe_{4.28}Ga_{0.72}O_{12}$ | 0.65 | 0.72 | 2.4 | 2.3 | 162 | −0.08 | 188 | O |
| 7 | $Y_{0.95}Sm_{0.30}Lu_{0.90}Gd_{0.85}Fe_{4.35}Ga_{0.65}O_{12}$ | 0.85 | 0.65 | 2.5 | 2.6 | 165 | −0.00 | 195 | O |
| 8 | $Y_{1.80}Sm_{0.50}Lu_{0.60}Gd_{0.10}Fe_{4.05}Ga_{0.95}O_{12}$ | 0.10 | 0.95 | 3.0 | 2.5 | 135 | −0.32 | 160 | X |
| 9 | $Y_{1.95}Sm_{0.25}Lu_{0.50}Gd_{0.30}Fe_{4.10}Ga_{0.90}O_{12}$ | 0.30 | 0.90 | 3.8 | 4.1 | 126 | −0.18 | 170 | X |
| 10 | $Y_{1.20}Sm_{0.40}Lu_{0.80}Gd_{0.60}Fe_{4.20}Ga_{0.80}O_{12}$ | 0.60 | 0.80 | 3.2 | 3.4 | 116 | −0.10 | 181 | X |
| 11 | $Y_{1.27}Sm_{0.20}Lu_{0.70}Gd_{2.83}Fe_{4.30}Ga_{0.70}O_{12}$ | 2.83 | 0.70 | 3.2 | 3.8 | 140 | +0.06 | 189 | X |
| 12 | $Y_{1.00}Sm_{0.25}Lu_{0.85}Gd_{0.90}Fe_{4.36}Ga_{0.64}O_{12}$ | 0.90 | 0.64 | 2.5 | 2.4 | 168 | +0.08 | 186 | X |
| 13 | $Y_{2.05}Sm_{0.55}Lu_{0.40}Fe_{4.12}Ga_{0.88}O_{12}$ | 0 | 0.88 | 1.8 | 1.9 | 196 | −0.35 | 172 | X |
| 14 | $Y_{1.97}Sm_{0.55}Lu_{0.45}Gd_{0.03}Fe_{4.13}Ga_{0.87}O_{12}$ | 0.03 | 0.87 | 1.8 | 1.8 | 194 | −0.31 | 176 | O |
| 15 | $Y_{1.30}Sm_{0.45}Lu_{0.90}Gd_{0.35}Fe_{3.25}Ga_{0.75}O_{12}$ | 0.35 | 0.75 | 1.8 | 1.7 | 195 | −0.17 | 185 | O |
| 16 | $Y_{0.42}Sm_{0.40}Lu_{1.30}Gd_{0.88}Fe_{4.42}Ga_{0.58}O_{12}$ | 0.88 | 0.58 | 1.9 | 1.8 | 202 | −0.00 | 203 | O |
| 17 | $Y_{0.17}Sm_{0.40}Lu_{1.50}Gd_{0.93}Fe_{4.44}Ga_{0.56}O_{12}$ | 0.93 | 0.56 | 1.8 | 1.9 | 198 | +0.07 | 205 | X |
| 18 | $Y_{1.90}Sm_{0.60}Lu_{0.50}Fe_{4.19}Ga_{0.81}O_{12}$ | 0 | 0.81 | 1.5 | 1.5 | 303 | −0.34 | 180 | X |
| 19 | $Y_{1.87}Sm_{0.60}Lu_{0.50}Gd_{0.03}Fe_{4.20}Ga_{0.80}O_{12}$ | 0.03 | 0.80 | 1.6 | 1.6 | 310 | −0.31 | 185 | O |
| 20 | $Y_{1.05}Sm_{0.65}Lu_{1.05}Gd_{0.25}Fe_{4.30}Ga_{0.70}O_{12}$ | 0.25 | 0.70 | 1.5 | 1.6 | 312 | −0.20 | 192 | O |
| 21 | $Y_{0.42}Sm_{0.65}Lu_{0.95}Gd_{0.98}Fe_{4.60}Ga_{0.40}O_{12}$ | 0.98 | 0.40 | 1.3 | 1.4 | 326 | −0.00 | 231 | X |
| 22 | $Y_{0.35}Sm_{0.65}Lu_{0.98}Gd_{1.02}Fe_{4.62}Ga_{0.38}O_{12}$ | 1.02 | 0.38 | 1.4 | 1.4 | 318 | +0.06 | 233 | X |
| 23 | $Y_{1.60}Sm_{0.85}Lu_{0.55}Fe_{4.40}GA_{0.60}O_{12}$ | 0 | 0.60 | 1.0 | 1.0 | 375 | −0.36 | 206 | X |
| 24 | $Y_{1.53}Sm_{0.85}Lu_{0.65}Gd_{0.03}Fe_{4.42}Ga_{0.58}O_{12}$ | 0.03 | 0.58 | 1.0 | 1.0 | 376 | −0.32 | 211 | O |
| 25 | $Y_{0.7}Sm_{0.85}Lu_{1.25}Gd_{0.20}Fe_{4.48}Ga_{0.52}O_{12}$ | 0.20 | 0.52 | 1.0 | 1.1 | 378 | −0.27 | 220 | O |
| 26 | $Y_{0.33}Sm_{0.85}Lu_{1.48}Gd_{0.34}Fe_{4.52}Ga_{0.48}O_{12}$ | 0.34 | 0.48 | 1.0 | 1.0 | 375 | −0.23 | 227 | O |
| 27 | $Y_{0.22}Sm_{0.85}Lu_{1.55}Gd_{0.38}Fe_{4.53}Ga_{0.47}O_{12}$ | 0.38 | 0.47 | 1.0 | 0.9 | 376 | −0.20 | 229 | O |
| 28 | $Y_{0.40}Sm_{0.70}Lu_{1.2}Gd_{0.70}Fe_{4.64}Ga_{0.36}O_{12}$ | 0.70 | 0.36 | 0.9 | 1.0 | 382 | −0.13 | 240 | O |
| 29 | $Y_{0.06}Sm_{0.65}Lu_{1.22}Gd_{1.07}Fe_{4.77}Ga_{0.23}$ | 1.07 | 0.23 | 1.0 | 1.1 | 368 | −0.00 | 253 | O |
| 30 | $Y_{0.01}Sm_{0.60}Lu_{1.24}Gd_{1.15}Fe_{4.78}Ga_{0.22}O_{12}$ | 1.15 | 0.22 | 0.9 | 0.8 | 380 | +0.08 | 255 | X |
| 31 | $Y_{1.40}Sm_{0.92}Lu_{0.68}Fe_{4.60}Ga_{0.40}O_{12}$ | 0 | 0.40 | 0.7 | 0.7 | 565 | −0.30 | 232 | X |
| 32 | $Y_{1.25}Sm_{0.92}Lu_{0.80}Gd_{0.03}Fe_{4.61}Ga_{0.39}O_{12}$ | 0.03 | 0.39 | 0.7 | 0.7 | 566 | −0.28 | 235 | O |
| 33 | $Y_{0.37}Sm_{0.92}Lu_{1.26}Gd_{0.45}Fe_{4.75}Ga_{0.25}O_{12}$ | 0.45 | 0.25 | 0.7 | 0.7 | 580 | −0.23 | 247 | O |
| 34 | $Y_{0.23}Sm_{0.92}Lu_{1.36}Gd_{0.49}Fe_{4.76}Ga_{0.24}O_{12}$ | 0.49 | 0.24 | 0.7 | 0.6 | 575 | −0.22 | 250 | O |

TABLE 1-continued

| No. | Composition | Q'ty of $Gd_x$ | Q'ty of $Ga_y$ | Bubble diameter d(μm) | Film thickness h(μm) | Bubble collapse field $H_o$ (Oe) | Temperature change ratio $H_{OT}$ of $H_o$ (%/°C.) | Curie temperature Tc (°C.) | Properties |
|---|---|---|---|---|---|---|---|---|---|
| 35 | $Y_{0.37}Sm_{0.90}Lu_{1.25}Gd_{0.48}Fe_{4.75}Ga_{0.25}O_{12}$ | 0.48 | 0.25 | 0.7 | 0.6 | 556 | −0.20 | 252 | O |
| 36 | $Y_{0.07}Sm_{0.90}Lu_{1.10}Gd_{0.93}Fe_{4.86}Ga_{0.14}O_{12}$ | 0.93 | 0.14 | 0.7 | 0.8 | 618 | −0.05 | 263 | O |
| 37 | $Y_{0.04}Sm_{0.82}Lu_{1.00}Gd_{1.14}Fe_{4.91}Ga_{0.09}O_{12}$ | 1.14 | 0.09 | 0.7 | 0.7 | 570 | −0.00 | 270 | O |
| 38 | $Y_{0.05}Sm_{0.75}Lu_{1.00}Gd_{1.20}Fe_{4.93}Ga_{0.07}O_{12}$ | 1.20 | 0.07 | 0.7 | 0.8 | 585 | +0.09 | 275 | X |
| 39 | $Sm_{1.10}Lu_{1.90}Fe_{4.80}Ga_{0.20}O_{12}$ | 0 | 0.20 | 0.5 | 0.5 | 760 | −0.37 | 257 | X |
| 40 | $Sm_{1.07}Lu_{1.90}Gd_{0.03}Fe_{4.82}Ga_{0.18}O_{12}$ | 0.03 | 0.18 | 0.5 | 0.5 | 765 | −0.34 | 262 | O |
| 41 | $Sm_{1.0}Lu_{1.70}Gd_{0.30}Fe_{4.92}Ga_{0.08}O_{12}$ | 0.30 | 0.08 | 0.5 | 0.5 | 775 | −0.25 | 270 | O |
| 42 | $Sm_{0.95}Lu_{1.75}Gd_{0.30}Fe_5O_{12}$ | 0.30 | 0 | 0.5 | 0.5 | 765 | −0.20 | 285 | O |
| 43 | $Sm_{1.2}Lu_{1.8}Fe_5O_{12}$ | 0 | 0.03 | 0.4 | 0.4 | 910 | −0.35 | 280 | X |
| 44 | $Sm_{1.1}Lu_{1.87}Gd_{0.03}Fe_5O_{12}$ | 0.03 | 0 | 0.4 | 0.4 | 885 | −0.34 | 285 | O |
| 45 | $Sm_{1.0}Lu_{1.7}Gd_{0.30}Fe_5O_{12}$ | 0.30 | 0 | 0.4 | 0.3 | 810 | −0.28 | 285 | O |
| 46 | $Sm_{0.4}Lu_{1.4}Gd_{1.20}Fe_5O_{12}$ | 1.20 | 0 | 0.6 | 0.5 | 650 | 0.00 | 284 | O |

Nos. 23 through 30 in FIG. 4 correspond to those of FIG. 3 and Table 1.

As can be seen clearly from FIG. 4, Tc becomes higher with an increasing quantity of Gd ions x, and the addition of Gd ions together with the Fe ions is extremely effective for raising Tc without increasing $4\pi_{film}$.

On the other hand, Ho barely changes but remains substantially constant even if x increases. This is because the value $4\pi M_{film}$ of the saturation magnetic induction of the film as a whole is kept constant by the cancelling effect between the saturation magnetic induction of iron $4\pi M_{Fe}$, and the saturation magnetic induction $4\pi M_{Gd}$ of Gd (see FIG. 2).

In other words, Ho is about half the value of $4\pi M_{film}$, but Ho is maintained at a substantially constant value, as is shown in FIG. 4. Hence it is obvious that $4\pi M_{film}$ is kept constant by the addition of Gd ions.

The diameter d of the magnetic bubbles is closely related to the value of $4\pi M_{film}$, and the bubble diameters of the eight kinds of garnet film Nos. 23 through 30 remain substantially constant within the range of 0.9 to 1.0 μm because the value of $4\pi M_{film}$ is kept substantially constant by the addition of Gd ions.

As shown in FIG. 4, the Curie temperature increases markedly with an increasing quantity of Gd ions x but this is substantially due to the increase in Fe ions. In other words, it relies upon the reduction in the quantities of Ga and Ge ions that are substituting for Fe ions.

If the combination of the quantity of Gd ions x with the quantity of Ga or Ge ions y is selected to be within a suitable range, therefore, the drop in Tc due to ion implantation can be compensated for, and an ion-implanted device having a wider operating range can be obtained.

For instance, if He+ ions are implanted with a doses of $1.6\times10^{15}/cm^2$ as described above, Tc drops by about 30° C., but when x and y are 0.5 and 0.4, respectively, Tc can be made to be about 30° C. higher than the case where there are no Ga ions, so that small magnetic bubbles having a diameter of about 1 μm can be supported over a wide temperature range.

The temperature coefficient of Ho, $H_{OT}$, is also important.

$H_{OT}$ usually has a negative value. The smaller its absolute value, the wider becomes the operating temperature range that can cope with external temperature changes.

A barium ferrite magnet is usually employed to apply the bias magnetic field of the magnetic bubble device, and a garnet film having a $H_{OT}$ of about −0.2%/°C. is used so as to match the temperature coefficient of this type of magnet. When the $H_{OT}$ of the garnet film is between −0.2 to −0.4%/°C., chromium is added to the barium ferrite magnet so at to match the temperature coefficient of the magnet with that of the film.

A garnet film having $H_{OT}=0$ is the most suitable, but if $H_{OT}$ has a positive value, the device can not be easily realized because there is no bias magnet whose temperature coefficient match the positive $H_{OT}$ over a wide temperature range.

For these reasons, it is preferable that $H_{OT}$ is zero or a negative value, and its absolute value is as small as possible.

Figure 5:
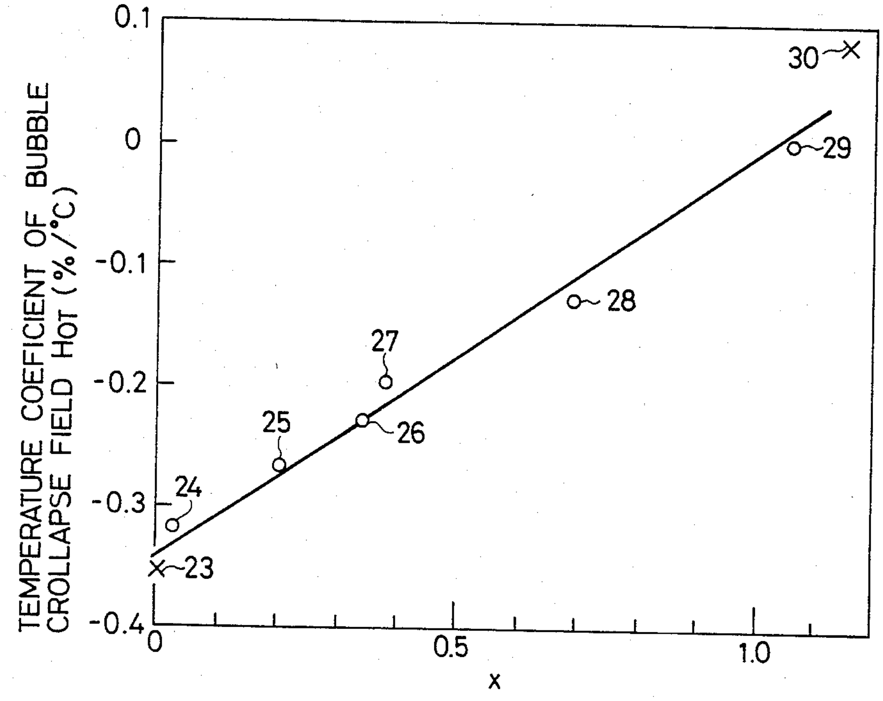

FIG. 5 illustrates the relationship between the temperature coefficient of the bubble collapse field, $H_{OT}$, and the quantity of Gd ions x, and the numerals 23 through 30 correspond to those in FIG. 3 and Table 1 in the same way as in FIG. 4.

As can be seen clearly from FIG. 5, $H_{OT}$ gradually approaches zero (or the absolute value of the negative number becomes progressively smaller) within a range of x of between 0 to about 1.05, and this results in a practical advantage. When x exceeds this value, however, $H_{OT}$ becomes a positive value and the garnet films of FIG. 5 are not preferable if x more than about 1.05. For this reason, X is put against the properties of the garnet film No. 30 in Table 1.

The boundary at which $H_{OT}$ can take a positive value is the line c in FIG. 3 and this is the upper limit of the quantity of Gd ions x. The upper limit of x varies along the line c depending upon the quantity of Ga and/or Ge ions y.

Figure 6:
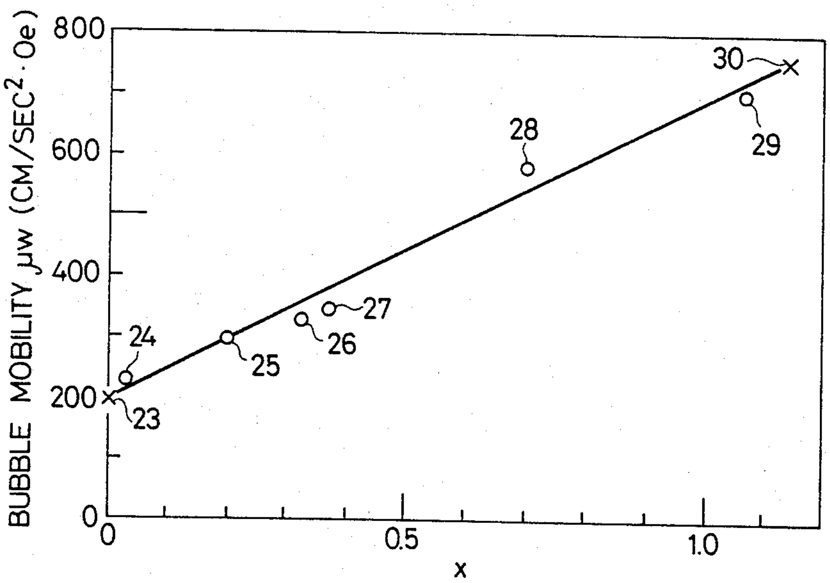

Another remarkable effect obtained by the addition of Gd ions is an increase in the magnetic bubble mobility $\mu w$. As shown in FIG. 6, the bubble mobility $\mu w$ increases markedly with an increase in the quantity of Gd ions x. Since an increase of $\mu w$ means that the magnetic bubbles can move at a high speed, it is obvious that the addition of Gd ions is extremely advantageous for the high speed operation of the device. Numerals 23 through 30 in FIG. 6 correspond to the numbers of the garnet films in Table 1 and FIG. 3 in the same way as in FIG. 5.

As shown in Table 1, the diameter of the magnetic bubbles which the garnet films of Nos. 1 through 7 and 12 support is between 2.4 to 2.5 $\mu m$. In FIG. 3, however, the diameter of the magnetic bubbles is at least 3 $\mu m$ in the region to the right of the line b, this region is not suitable for a high density magnetic bubble device having a memory density of at least 1 Mbit/$cm^2$.

The diameter of the magnetic bubbles becomes smaller in the region to the left of the line b, and it is 1.8 $\mu m$ for Nos. 13 through 17, 1.3 to 1.6 $\mu m$ for Nos. 18 through 22, 0.7 $\mu m$ for Nos. 31 through 38, and 0.4 to 0.5 $\mu m$ for Nos. 39 through 46.

Accordingly, the range of x and y that provides a satisfactory result is to the left of the line b, below the line c and above the line a and the region that satisfies these conditions is the region A in FIG. 3.

The garnet films shown in Table 1 all have the composition $(YSmLu)_{3-x}Gd_xFe_{5-y}Ga_yO_{12}$ or $(SmLu)_{3-x}Gd_xFe_5O_{12}$. In garnet films for magnetic bubble devices, the roles of Ga and Ge are fundamentally the same and substantially the same result can be obtained in $(YSmLuCa)_{3-x}Gd_xFe_{5-y}Ge_yO_{12}$ in which Ge is added instead of Ga, for example. If a composition containing both Ga and Ge such as $(YSmLuCa)_{3-x}Gd_xFe_{5-y}(GaGe)_yO_{12}$ is used, the result is the same as when Ga or Ge is used alone.

As can be clearly understood from the foregoing explanation, in accordance with the present invention, since the garnet film of the invention has a higher Curie temperature Tc than that of conventional films, the garnet film can be used sufficiently as the garnet film for an ion-implanted device even if Tc drops due to ion implantation.

The garnet film of the invention can support magnetic bubbles having an extremely small diameter, provides a high bubbles mobility, and can obtain an extremely desirable result when applied to ion-implanted devices.

The magnetic garnet film in accordance with the present invention can be easily formed on the (111) plane, of a single crystal substrate of non-magnetic garnet (e.g., $Gd_3Ga_5O_{12}$ or the like) by the heretofore known liquid phase epitaxial method in the same way as other garnet films that have been generally used, and a film having a thickness of approx. 3 to 0.3 $\mu m$ is used. The most desirable result of the present invention can be obtained when a garnet film is formed on the (111) plane of the substrate but it may also be formed on the other planes such as the (110) and (100) planes.

The ion-implanted region for driving the bubbles can be formed by implanting single or multiple ions such as hydrogen, helium, deuterium, neon and the like. The depth of the ion-implanted region is generally about $\frac{1}{3}$ of the film thickness but may of course vary to some extent. The ion dosage can be selected from a wide range, and it is selected as appropriate according to other conditions, such as the kinds of ions.

The present invention can be naturally applied not only to devices of the type in which the whole of the propagation circuit and functional portion are formed by ion implantation, but also to magnetic bubble devices of the type in which part of the propagation circuit and functional portion is formed by local ion implantation, and the rest is composed of permalloy or conductors in the same way as in conventional devices, or current-access devices. And, the present invention makes it possible to fabricate a magnetic bubble memory device which can operate in a temperature range which is wider than that of conventional devices.

What is claimed is:

1. A garnet film which is formed on a non-magnetic single crystal substrate of garnet and which has an ion-implanted region in at least one desired position thereof; said garnet film having a composition expressed by the general formula $R_{3-x}Gd_xFe_{5-y}M_yO_{12}$, where R is Sm and at least one element selected from the group consisting of Y, Lu and Ca; M is at least one element selected from the group consisting of Ga and Ge; and the values of x and y are defined to be within a region A encompassed by or on a line (a) connecting point 44 (0.03, 0) and point 2 (0.03, 0.94), a line (b) connecting point 2 (0.03, 0.94) and point 7 (0.85, 0.65), a line (c) connecting point 7 (0.85, 0.65) and point 46 (1.20, 0) and line (d) connecting point 46 (1.20, 0) and point 44 (0.03, 0) in FIG. 3; said ion-implanted region being formed by selectively implanting at least one kind of ions selected from the group consisting of hydrogen, deuterium, helium and neon ions into the desired portion of said garnet film.

2. The garnet film as defined in claim 1 wherein said garnet film is formed on the (111) plane of said single crystal substrate.

3. The garnet film as defined in claim 1 or 2 wherein said garnet film is approximately 3 to 0.3 $\mu m$ thick.

4. The garnet film as defined in claim 1 or 2 wherein said single crystal substrate is either $Gd_3Ga_5O_{12}$ or $Sm_3Ga_5O_{12}$.

5. The garnet film as defined in claim 1 wherein the depth of said ion-implanted region is about $\frac{1}{3}$ the thickness of said garnet film.

* * * * *